US008121200B2

(12) United States Patent
Zheng

(10) Patent No.: US 8,121,200 B2
(45) Date of Patent: Feb. 21, 2012

(54) MULTI-LEVEL LVDS DATA TRANSMISSION WITH EMBEDDED WORD CLOCK

(75) Inventor: Dong Zheng, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 931 days.

(21) Appl. No.: 11/746,610

(22) Filed: May 9, 2007

(65) Prior Publication Data

US 2008/0012746 A1    Jan. 17, 2008

Related U.S. Application Data

(60) Provisional application No. 60/830,861, filed on Jul. 13, 2006.

(51) Int. Cl.
*H04B 14/04* (2006.01)

(52) U.S. Cl. ........ 375/242; 375/238; 375/244; 375/293; 375/294

(58) Field of Classification Search .................. 375/238, 375/257, 288, 293; 341/143, 144
See application file for complete search history.

(56) References Cited

U.S. PATENT DOCUMENTS

| 6,317,469 | B1 * | 11/2001 | Herbert | 375/293 |
|---|---|---|---|---|
| 2004/0223545 | A1 * | 11/2004 | Lee | 375/238 |
| 2005/0147178 | A1 * | 7/2005 | Kikuchi | 375/288 |
| 2006/0290550 | A1 * | 12/2006 | Lee | 341/144 |

* cited by examiner

*Primary Examiner* — Khanh C Tran
*Assistant Examiner* — Eboni Hughes
(74) *Attorney, Agent, or Firm* — Fogg & Powers LLC

(57) ABSTRACT

A multi-level signal uses the third/fourth signal level to signal both a word clock edge and a data word boundary. At the receiver, a level detector detects a transition to or from the third/fourth level as a clock signal transition and the word boundary. The bit clock can be recovered using a conventional clock multiplier. Bi-level signaling is used for data between the word boundaries. Additional signal states are available in the multi-level signal by modulating the pulse width at the third/fourth signal level.

17 Claims, 2 Drawing Sheets

MULTI-LEVEL LVDS DATA TRANSMISSION WITH EMBEDDED WORD CLOCK

CROSS-REFERENCE TO RELATED APPLICATIONS

The present application is related to copending U.S. provisional application ("Copending Application"), entitled "Tri-level LVDS Data Transmission with Embedded Word Clock", Ser. No. 60/830,861, filed on Jul. 13, 2006. The Copending Application is hereby incorporated by reference in its entirety.

BACKGROUND OF THE INVENTION

1. Field of the Invention

The present invention relates to data communication; in particular, the present invention relates signaling conventions in data communication.

2. Discussion of the Related Art

In high speed data communications, a serial format has many advantages. For example, a serial format does not require synchronizing the parallel data and avoids the high cost of multiple conductors. However, the serial format must allow the receiver to easily recover the clock signal and to recognize data signal boundaries (e.g., word boundaries). Typically, the receiver includes a sophisticated clock recovery circuit for extracting an embedded clock signal, and the transmitted signal includes a special bit pattern or encoding to demarcate data boundaries.

SUMMARY

According to one embodiment of the present invention, a multi-level signal uses a third signal (and optionally, a fourth signal level) to signal both a word clock edge and a data word boundary. At the receiver, a level detector detects a transition to or from the third level as a clock signal transition and the word boundary. The bit clock can be recovered using a conventional clock multiplier. Bi-level signaling is used for data between the word boundaries.

According to another embodiment of the present invention, additional signal states are available in the multi-level signal by modulating the pulse width at the third signal level. In one implementation, when the signal stays at the third level for one bit period, it signals that the transmitted bits are data. In that implementation, when the signal stays at the third level for two and three bit periods, it signals that the transmitted bits are control information and audio data, respectively.

The present invention is better understood upon consideration of the detailed description below and the accompanying drawings.

DETAILED DESCRIPTION OF THE PREFERRED EMBODIMENTS

The present invention is particularly applicable to high speed data transmission operations where a serial data format is preferred and over a low-noise channel. One application is, for example, is data communication between two movable components of a device, such as between the foldable pieces of a "flip" cellular phone.

Figure 1A:
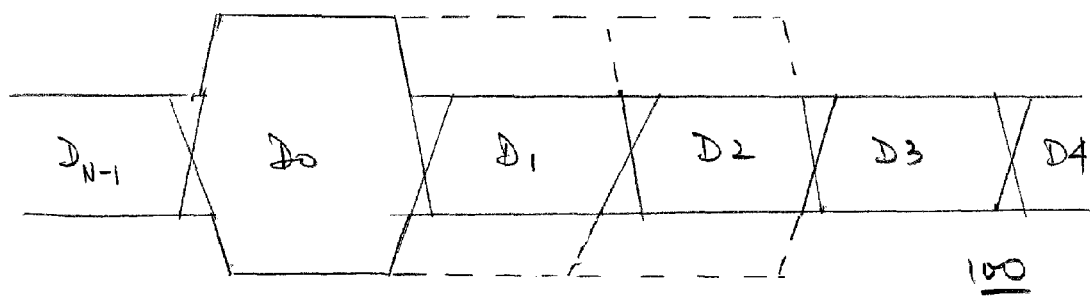
FIGS. 1(a) and 1(b) show a multi-level serial data signals 100 and 150, respectively, according to one embodiment of the present invention.
Figure 1B:
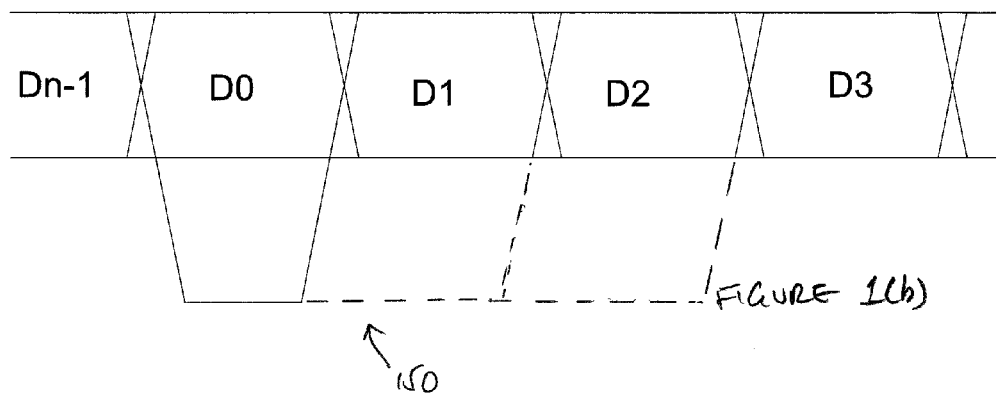

FIGS. 1(a) and 1(b) show a multi-level serial data signals 100 and 150, respectively, according to one embodiment of the present invention. As shown in FIG. 1(a), multi-level serial data signal 100 uses a low voltage differential signaling (LVDS) format (e.g., signal voltage levels between ±3.3 volts). Serial data signal 100 uses third level signaling (e.g., ±200 mV) for the first bit (i.e., bit D0) within a data word (e.g., D0-D15) and bi-level signaling (e.g., ±100 mV) for the remaining bits within the data word. The term "word" denotes an organization of data that consists of multiple bits. Typical convenient word lengths are 8, 16, 32, 64, or 128, although there are no restrictions on the number of bits. FIG. 1(b) shows an alternative multi-level serial data signal 150 with a common mode component. A common mode component may give out relatively stronger electromagnetic interference. In a lower speed application, the data signal FIG. 1(b) is preferable because it is simpler to implement, relative to the data signal of FIG. 1(a).

FIGS. 1(a) and 1(b) also show that additional signal states are available in the multi-level signal by modulating the pulse width at the third signal level. As shown in each of FIGS. 1(a) and 1(c), the multi-level signal may stay at the third level for one, two or three bit periods (i.e., D0, D0-D1 and D0-D2, respectively). In one implementation, the pulse width encodes the nature of the bits transmitted. (Of course, the pulse width may be modulated for even greater duration.) For example, if the muliti-level signal returns to bi-level signaling after bit D0, the transmitted bits are indicated to be data. In that implementation, when the multi-level signal stays at the third level for two and three bit periods, it signals that the transmitted bits are control information and audio data, respectively.

Figure 2A:
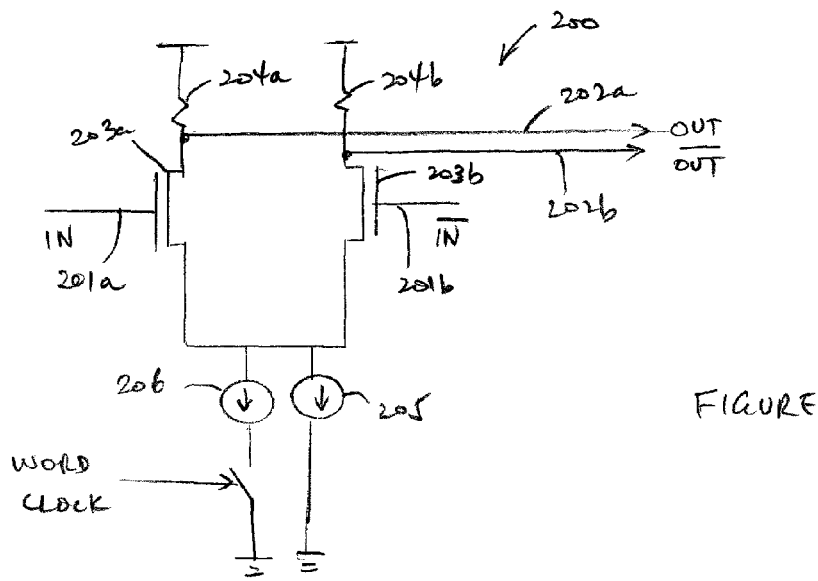
FIG. 2(a) shows transmitter circuit 200 for a multi-level serial data signal, in accordance with one embodiment of the present invention.

FIG. 2(a) shows transmitter circuit 200 for a multi-level serial data signal, in accordance with one embodiment of the present invention. As shown in FIG. 2(a), transmitter circuit 200 includes a differential amplifier having differential input terminals 201a and 201b driving the control input terminals of transistors 203a and 203b. The source and drain terminals of transistors 203a and 203b are serially connected respectively to the power supply reference voltages through load transistors 204a and 204b and current source 205 to provide a differential output signal across output terminals 202(a) and 202(b). An additional switched current source 206 is provided to modulate the current through the load transistors for multi-level signaling. During bi-level signaling, the switch current source is switched off. To signal at the third signal level (e.g., at a word boundary) switched current source 206 is turned on to increase the voltage swing across output terminals 202(a) and 202(b).

Figure 2B:
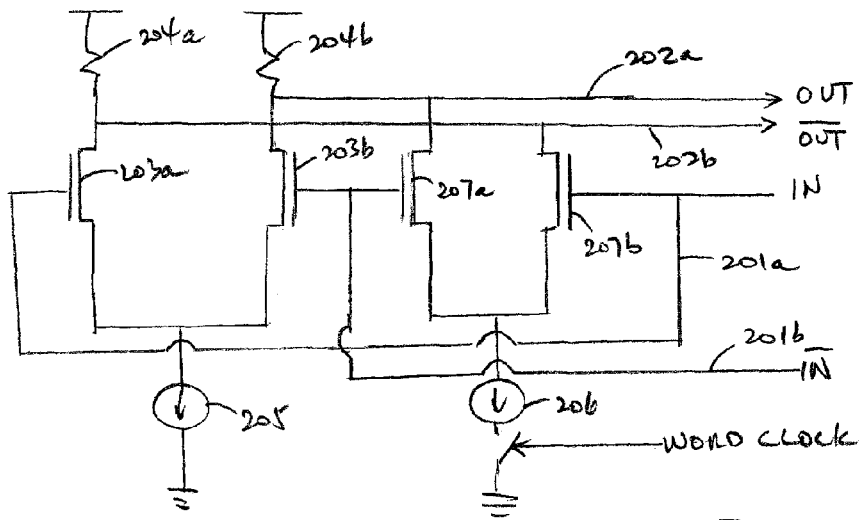
FIG. 2(b) shows transmitter circuit 250 for a multi-level serial data signal, in accordance with one embodiment of the present invention.

An alternative implementation is shown in FIG. 2(b) as transmitter circuit 250, in accordance with one embodiment of the present invention. Transmitter 250 differs from transmitter 200 by sourcing the current in switched current source 206 through additional input transistors 207(a) and 207(b), which are activated only during signaling at the third signal level. Input transistors 207(a) and 207(b) are connected in parallel to input transistors 201(a) and 201(b). Transmitter 250 provides better dynamic range than transmitter 200 of FIG. 2(a).

The high level (e.g., the third level) can be adjusted by separate circuitry if a constant common mode is desired, or by a push-pull circuitry configuration. Otherwise for a constant voltage high level, the waveform can be shown as in FIG. 1(b).

Figure 3:
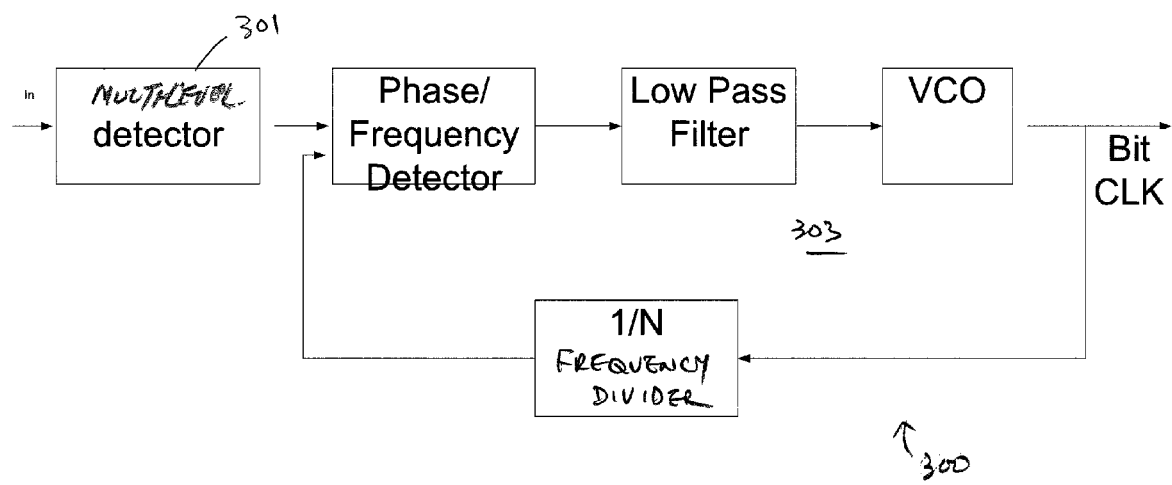
FIG. 3 shows a block diagram of a receiver 300 for a multi-level serial data signal, in accordance with one embodiment of the present invention.

FIG. 3 shows a block diagram of a receiver 300 for a multi-level serial data signal, in accordance with one embodiment of the present invention. In receiver 300, a level detector 301 is set to detect the signal transitions to the third (or the fourth, if present) signal level across output terminals 202(a) and 202(b). As this signal transitions occur at a word boundary, the signal transition can be used as input to a clock multiplier 303 (which is typically implemented to include a phase locked loop, as illustrated in FIG. 3) useful in generating the bit clock that is synchronous with the bits between the bits signaled at the third (or fourth) signal level, which in turn is used to deserialize the serial data. When word synchronization is substantially achieved (i.e., a good phase lock is achieved by the phase-locked loop in clock multiplier 303), third (or fourth) level signaling at the word boundary may be omitted to save power—i.e., using only bi-level signaling—until either re-synchronization is required or a change in the nature of the data transmitted. The receiver may indicate achievement of synchronization to the transmitter, when the receiver and the transmitter are capable of bidirectional communication.

It is observed that, using the above signaling scheme, even including the circuits for recovering the bit clock from the transmitted signal, the resulting receiver has a lower power dissipation and a simpler circuitry than that using a conventional clock recover circuit.

The above detailed description is provided to illustrate specific embodiments of the present invention and is not intended to be limiting. Many variations and modifications within the scope of the invention are possible. The present invention is set forth in the accompanying claims.

I claim:

1. A method for digital signaling of a serial sequence of contiguous data bits, comprising:
   transmitting a serial digital signal including a first bit at a predetermined position in a first portion of the serial sequence of contiguous data bits using a first voltage level of a multi-level set of voltage levels; and
   transmitting the serial digital signal including a second portion of the serial sequence of contiguous data bits using a second voltage level of the multi-level set of voltage levels different from the first voltage level, wherein transitioning to or from the first voltage level indicates a clock signal transition and a word boundary, and a predetermined number of the contiguous data bits transmitted at the first voltage level indicates whether the transmitted data bits are data information or control information and wherein upon receiving an indication that synchronization is achieved, transmitting at least the second portion of the contiguous sequence of data bits using the second voltage level.

2. A method as in claim 1, wherein the first voltage level is asymmetrical about zero volts.

3. A method as in claim 1, further comprising transmitting at the first voltage level a plurality of contiguous data bits, wherein the number of contiguous data bits transmitted at the first voltage level encodes additional data information.

4. A method as in claim 1, wherein the number of contiguous data bits transmitted at the first voltage level indicates whether the transmitted sequence of contiguous data bits is video data, control information, or audio data.

5. A method for digital signaling of a serial sequence of contiguous data bits, comprising:
   receiving a serial digital signal including a first bit at a predetermined position in a first portion of the serial sequence of contiguous data bits, the first bit being transmitted using a first voltage level of a multi-level set of voltage levels;
   receiving the serial digital signal including a second portion of the serial sequence of contiguous data bits, the second portion of the serial sequence of contiguous data bits being transmitted at a second voltage level of the multi-level set of voltage levels different from the first voltage level;
   determining if a predetermined number of the contiguous data bits is being transmitted at the first voltage level, the predetermined number indicating whether the received serial digital signal includes data information or control information;
   detecting a transition from the first voltage level to the second voltage level; and
   responsive to the detecting, generating a bit clock synchronous with a plurality of bits located between the serial sequence of contiguous data bits received at the second voltage level of the multi-level set of voltage levels.

6. A method as in claim 5, wherein the first voltage level is asymmetrical about zero volts.

7. A method as in claim 5, further comprising detecting the transmission of the first voltage level over a plurality of contiguous data bits, wherein the number of bits transmitted at the first voltage level encodes additional data information.

8. A method as in claim 7, wherein the number of contiguous data bits transmitted at the first voltage level also encodes whether the transmitted sequence of contiguous data bits is video data, control information, or audio data.

9. A method as in claim 5, wherein upon achieving a synchronization, signaling to a transmitter to transmit both first and second portions of the sequence of contiguous data bits using the second voltage level.

10. A transmitter circuit for digital signaling of a serial sequence of contiguous data bits, comprising:
    a first transistor;
    a second transistor coupled to the first transistor;
    a first current source; and
    a switch coupled to the first current source to selectively couple the first current source to an input of the first transistor and second transistor such that the first transistor and second transistor are enabled to:
    output a serial digital signal including a first bit at a predetermined position in a first portion of the serial sequence of contiguous data bits using a first voltage level of a multi-level set of voltage levels; and
    output the serial digital signal including a second portion of the serial sequence of contiguous data bits using a second voltage level of the multi-level set of voltage levels different from the first voltage level, wherein a transition to or from the first voltage level indicates a clock signal transition and a word boundary, and a predetermined number of the contiguous data bits output at the first voltage level indicates whether the output serial digital signal includes data information or control information, and wherein upon receiving an indication that synchronization is achieved, transmitting at least the second portion of the contiguous sequence of data bits using the second voltage level.

11. The transmitter circuit as in claim 10, wherein the first transistor and second transistor comprise a differential amplifier.

12. The transmitter circuit as in claim 10, wherein the switch is enabled to selectively couple the first current source to the input of the first transistor and the input of the second transistor and modulate a current flow through the first transistor and the second transistor.

13. The transmitter circuit as in claim 10, wherein the switch is enabled to selectively couple the first current source to the input of the first transistor and the input of the second transistor and modulate a current flow through the first transistor and the second transistor to signal at least one of a word clock edge and a data word boundary.

14. The transmitter circuit as in claim 10, wherein a source terminal of the first transistor is coupled to a source terminal of the second transistor and a second current source.

15. A receiver circuit for digital signaling of a serial sequence of contiguous data bits, comprising:
   a level detector; and
   a phase-locked loop coupled to an output of the level detector, wherein the level detector is enabled to:
   receive a serial digital signal including a first bit at a predetermined position in a first portion of the serial sequence of contiguous data bits, the first bit being transmitted using a first voltage level of a multi-level set of voltage levels;
   receive the serial digital signal including a second portion of the serial sequence of contiguous data bits, the second portion of the serial sequence of contiguous data bits being transmitted at a second voltage level of the multi-level set of voltage levels different from the first voltage level;
   detect a transition from or to the first voltage level, wherein the phase-locked loop is enabled to generate a bit clock synchronous with a plurality of bits located between the serial sequence of contiguous data bits received at the second voltage level of the multi-level set of voltage levels; and
   determine if a predetermined number of the contiguous data bits is being transmitted at the first voltage level, the predetermined number indicating whether the received serial digital signal includes data information or control information.

16. The receiver circuit as in claim 15, wherein the level detector is a multi-level serial data signal detector.

17. The receiver circuit as in claim 15, wherein the phase-locked loop comprises a clock multiplier.

* * * * *